US008865009B2

(12) United States Patent
Sakai

(10) Patent No.: US 8,865,009 B2

(45) Date of Patent: Oct. 21, 2014

(54) PROCESSES FOR PRODUCING SUBSTRATE WITH PIERCING APERTURE, SUBSTRATE FOR LIQUID EJECTION HEAD AND LIQUID EJECTION HEAD

(71) Applicant: Canon Kabushiki Kaisha, Tokyo (JP)

(72) Inventor: Toshiyasu Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/944,006

(22) Filed: Jul. 17, 2013

(65) Prior Publication Data

US 2014/0034604 A1 Feb. 6, 2014

(30) Foreign Application Priority Data

Aug. 1, 2012 (JP) ................................ 2012-171252

(51) Int. Cl.

*G01D 15/00* (2006.01)

(52) U.S. Cl.

USPC .................. 216/27; 216/17; 216/19; 438/740

(58) Field of Classification Search

CPC .... B41J 2/11628; B41J 2/1461; B41J 2/1621; H01L 21/31116

USPC ........... 216/13, 17, 27, 39, 58, 67, 79, 80, 19, 216/72; 438/717, 719, 740, 739

See application file for complete search history.

(56) References Cited

U.S. PATENT DOCUMENTS

| | | | | |
|---|---|---|---|---|
| 7,320,513 | B2 | 1/2008 | Kim et al. | |
| 8,496,842 | B2 * | 7/2013 | Udayakumar et al. | 216/66 |
| 2005/0088491 | A1 * | 4/2005 | Truninger et al. | 347/71 |
| 2005/0157096 | A1 * | 7/2005 | Truninger et al. | 347/71 |
| 2007/0257007 | A1 | 11/2007 | Kim et al. | |
| 2008/0073320 | A1 | 3/2008 | Kim et al. | |
| 2008/0156780 | A1 * | 7/2008 | Voronov et al. | 219/121.69 |

FOREIGN PATENT DOCUMENTS

JP 4119379 B2 7/2008

* cited by examiner

*Primary Examiner* — Lan Vinh

(74) *Attorney, Agent, or Firm* — Fitzpatrick, Cella, Harper & Scinto

(57) ABSTRACT

The invention provides a process for producing a substrate with a piercing aperture, the piercing aperture being formed by conducting dry etching from the side of a second surface opposite to a first surface of a substrate to the first surface, the process comprising, in the following order, the steps of (a) forming a groove around a region where the piercing aperture is formed in the first surface of the substrate, (b) forming an etch-stop layer in the region where the piercing aperture is formed in the first surface of the substrate and in the interior of the groove, and (c) forming the piercing aperture by conducting the dry etching from the side of the second surface.

17 Claims, 4 Drawing Sheets

PROCESSES FOR PRODUCING SUBSTRATE WITH PIERCING APERTURE, SUBSTRATE FOR LIQUID EJECTION HEAD AND LIQUID EJECTION HEAD

BACKGROUND OF THE INVENTION

1. Field of the Invention

The present invention relates to processes for producing a substrate with a piercing aperture, a substrate for a liquid ejection head and a liquid ejection head.

2. Description of the Related Art

As methods for forming a liquid supply port in an element substrate of a liquid ejection head, methods such as drilling, laser beam machining and sand blasting, and anisotropic crystal etching have been proposed.

In a method of forming a liquid supply port by dry etching using an etchant gas, a liquid supply port of an almost perpendicular form is formed. As a result, a chip size can be made smaller than a case where a liquid supply port is formed by anisotropic crystal etching.

In the method of forming the liquid supply port by the dry etching, an etch-stop layer is formed on a front surface of an element substrate. Dry etching is then performed from a back surface of the element substrate to the etch-stop layer to form a piercing aperture. Thereafter, the etch-stop layer is removed.

Here, it is known that when an etched surface reaches the etch-stop layer, a phenomenon called notching in which the etching proceeds to a direction perpendicularly to a supply port forming direction (hereinafter also referred to as a lateral direction or plane direction) by influence of charging occurs. When the notching occurs, an opening portion of the liquid supply port on the front surface of the substrate is spread, in some cases, up to a heat-generating element or a wiring thereof, thereby lowering reliability.

Japanese Patent No. 4119379 describes a process of forming a first trench in a front surface of a substrate and forming a second trench in a bottom portion of the first trench from a back surface of the substrate. According to this process, it is said that influence of notching is not exerted upon the formation of the second trench because an end portion of a liquid supply port is defined by the first trench.

SUMMARY OF THE INVENTION

According to the present invention, there is provided a process for producing a substrate with a piercing aperture, the piercing aperture being formed by conducting dry etching from a side of a second surface opposite to a first surface of a substrate to the first surface, the process comprising, in the following order, the steps of:

(a) forming a groove around a region where the piercing aperture is formed in the first surface of the substrate,
(b) forming an etch-stop layer in the region where the piercing aperture is formed in the first surface of the substrate and in the interior of the groove, and
(c) forming the piercing aperture by conducting the dry etching from the side of the second surface.

According to the present invention, there is also provided a process for producing a substrate for a liquid ejection head, comprising forming a liquid supply port by using the process for producing the substrate with the piercing aperture.

According to the present invention, there is further provided a process for producing a liquid ejection head comprising a substrate having an ejection-energy-generating element which generates energy for ejecting a liquid in a first surface thereof, and a flow path forming member in which a liquid ejection orifice which ejects the liquid and a liquid flow path communicating with the liquid ejection orifice are formed on a side of the first surface of the substrate, the substrate having a liquid supply port which supplies the liquid to the liquid flow path, the process comprising, in the following order, the steps of:

(a) forming a groove around a region where the piercing aperture is formed in the first surface of the substrate,
(b) forming an etch-stop layer in the region where the piercing aperture is formed in the first surface of the substrate and in the interior of the groove, and
(c) forming the liquid supply port by conducting dry etching from the side of a second surface opposite to the first surface.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the process described in Japanese Patent No. 4119379, there is need of setting the opening area of the first trench on the assumption that the notching spreads to some extent. However, the spread of the notching varies according to an etching time after the etched surface by the dry etching reaches the etch-stop layer (hereinafter also referred to as an over etching time). Therefore, the opening area of the first trench becomes large when dispersion of the etching rate and dispersion of the thickness of the element substrate are considered, leading to an increase in the chip area, so that productivity may be lowered in some cases.

In the construction shown in Japanese Patent No. 4119379, the influence of a level difference by the first trench formed on the front surface is exerted on the production process of a monolithic system in which a resin layer forming a liquid flow path or an ejection orifice is laminated, and so there is a possibility that printing performance may be lowered.

Thus, the present invention can provide a process for producing a substrate with a piercing aperture, said substrate having a piercing aperture of a form almost perpendicular to the substrate, by which the spread of an opening portion by notching can be inhibited. The present invention can provide a process for producing a substrate for a liquid ejection head or a liquid ejection head which has a liquid supply port of an almost perpendicular form, by which the spread of an opening portion by notching can be inhibited.

Embodiments of the present invention will hereinafter be described with reference to the drawings.

Figure 4:
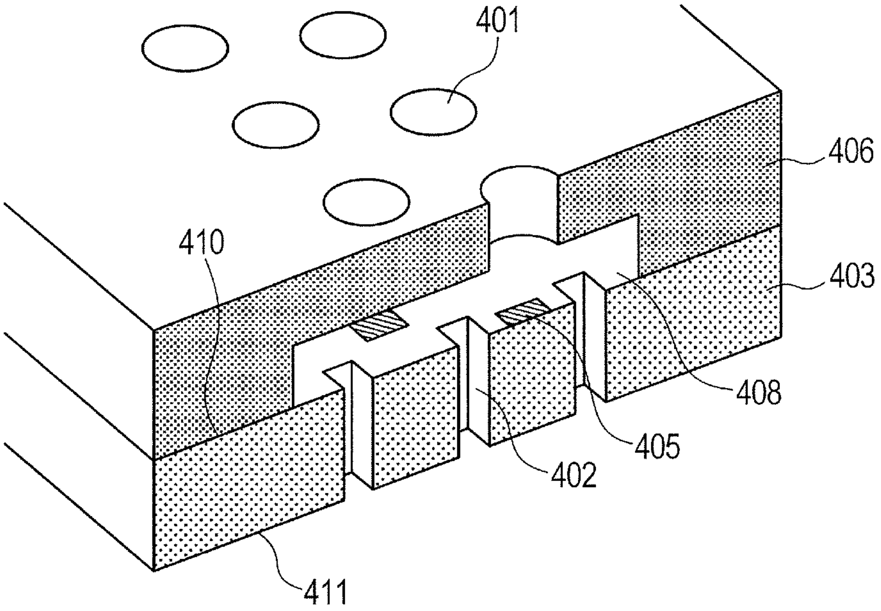
FIG. 4 is a schematic sectional perspective view illustrating a constructional example of a substrate for a liquid ejection head obtained by the production process according to the embodiment.

The structure of a substrate for a liquid ejection head produced by a production process according to an embodiment is described in advance. FIG. 4 is a schematic perspective view illustrating a constructional example of a substrate for a liquid ejection head obtained by the production process according to this embodiment.

In FIG. 4, the substrate for the liquid ejection head is provided with a silicon substrate 403 having a first surface 410 and a second surface 411 opposite to the first substrate, a nozzle plate (also referred to as a flow path forming member) 406 laminated on the substrate, and an ejection-energy-generating element 405.

The nozzle plate 406 is arranged on the side of the first surface of the substrate, and a liquid flow path 408 filled with a liquid to be ejected is formed in the nozzle plate 406. A liquid supply port 402 supplying the liquid to the liquid flow path is further formed so as to pass through from the second surface to the first surface of the substrate.

The nozzle plate 406 may also be formed by successively laminating a plurality of resin layers on the substrate. In addition, a nozzle 401 for ejecting the liquid (also referred to as an ejection orifice) is formed in the nozzle plate 406 so as to communicate with the liquid flow path. For example, the nozzle plate 406 can be formed of a flow path side wall member forming a lateral surface of the liquid flow path 408 and an ejection orifice member forming the nozzle 401.

Incidentally, a groove which will be described later is not illustrated in FIG. 4.

Figure 3:
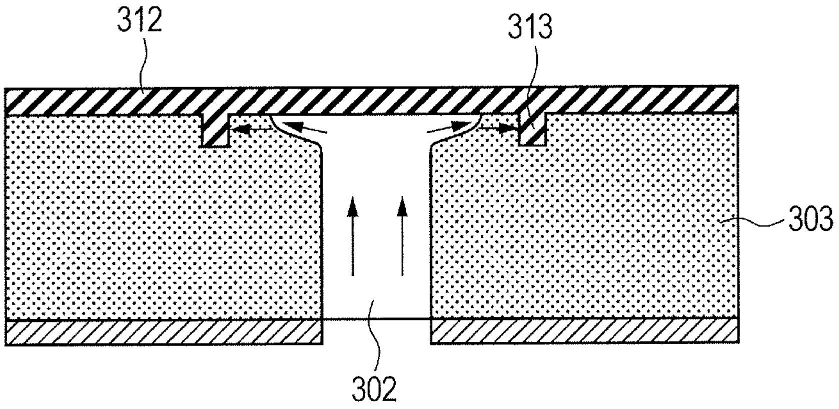
FIG. 3 is a schematic sectional view illustrating a substrate for a liquid ejection head which indicates the feature of the production process according to the embodiment.

This embodiment will now be described in detail with reference to FIG. 3.

When a liquid supply port 302 is formed by dry etching, an etch-stop layer 312 is provided on a front surface of the substrate. The dry etching is performed from the side of a back surface of the substrate toward the etch-stop layer 312 formed on the front surface of the substrate to form the liquid supply port 302 as a piercing aperture.

An insulation film such as an oxide film is generally used as the etch-stop layer in the dry etching for the silicon substrate. When what is called a Bosch process, in which processes of etching with $SF_6$ and deposition with $C_4F_8$ are alternately repeated, is used in the dry etching, a resist may also be used as the etch-stop layer.

When the dry etching is further continued after the etched surface reaches the etch-stop layer 312 upon the formation of the liquid supply port, the spread of the etching to a lateral direction which is called notching is caused by influence of charging in the etch-stop layer.

In this embodiment, a groove 313 is formed around a region where the liquid supply port is formed in the front surface of the substrate, whereby the etch-stop layer is further embedded in the groove 313. Even when an opening portion on the front surface side of the substrate is spread by the notching, the spread of the liquid supply port 302 can be prevented by the etch-stop layer 312 embedded in the groove 313 owing to this construction.

In addition, the degree of the notching varies according to the over etching time. As described above, however, it is difficult from the viewpoint of production to always keep the over etching time constant. According to the constriction of this embodiment, the spread of the opening portion over the groove can be prevented even when the over etching time is excessive. In addition, since the etching is stopped by the etch-stop layer formed in the groove, the shape of the front surface side opening portion of the liquid supply port can also be defined.

The depth of the groove is desirably set in view of the degree of the notching and the influence on the depression of the liquid flow path thereof. However, the depth is within a range of favorably 1 μm or more and 30 μm or less, more favorably 3 μm or more and 10 μm or less.

Figure 5:
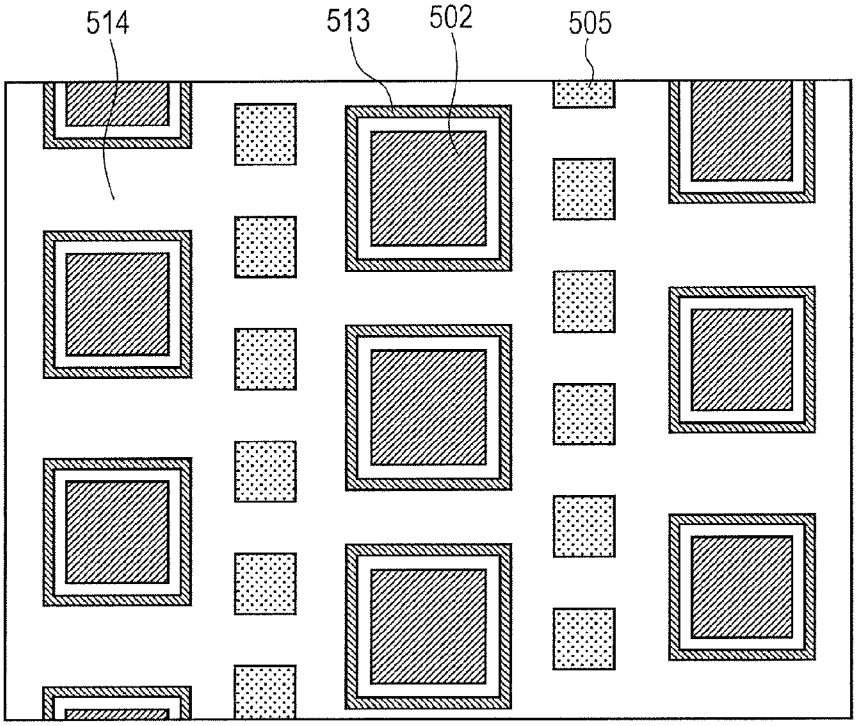
FIG. 5 is a schematic plan view illustrating an arrangement around a liquid supply port of the substrate in the embodiment.

FIG. 5 is a schematic plan view for explaining a constructional example of a substrate before a liquid supply port is formed. In FIG. 5, the substrate is so constructed that liquid supply ports 502 are formed on both sides of an ejection-energy-generating element 505, and so a liquid is supplied to the ejection-energy-generating element from both directions. Incidentally, an etch-stop layer is not illustrated in FIG. 5.

In this embodiment, a groove 513 is formed around a region 502 where the liquid supply port is formed so as to surround the region as illustrated in FIG. 5, and the etch-stop layer is formed including the interior of the groove 513. The etch-stop layer is arranged at least over a range of from an upper portion of the region where the liquid supply port is formed to the interior of the groove. In other words, the etch-stop layer is arranged at least on a substrate front surface region surrounded by the groove and in the interior of the groove. Even when the notching is widely spread, the spread can be prevented by the etch-stop layer 312 embedded in the groove owing to such a construction. Incidentally, the effect of the present invention can be sufficiently exhibited so far as the etch-stop layer is arranged on at least a lateral surface within the groove (lateral surface on the side of the liquid supply port). In other words, the effect of the present invention can be sufficiently exhibited so far as the etch-stop layer is arranged at least over the range of from the region where the liquid supply port is formed on the front surface of the substrate to the lateral surface within the groove.

In order to improve reliability, it is desirable to prevent the notching from spreading in a direction toward the ejection-energy-generating element 505 from the liquid supply port. In this embodiment, a wiring for supplying electric power to the ejection-energy-generating element (not illustrated) is arranged on a beam 514 that is a substrate region between adjoining liquid supply ports, so that it is also desirable to prevent the notching from spreading in the direction of the beam 514. Accordingly, in this embodiment, the groove 513 is formed around an opening position of the liquid supply port, that is to say, the groove is formed so as to surround a position which the etched surface reaches as illustrated in FIG. 5.

EXAMPLE 1

The process for producing the substrate for the liquid ejection head according to this embodiment will now be described by an example with reference to FIGS. 1A to 1I.

Figure 1A:
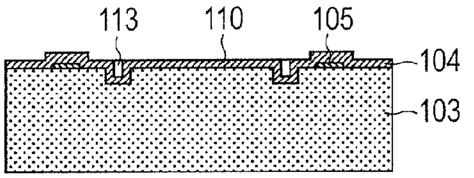
FIGS. 1A, 1B, 1C, 1D, 1E, 1F, 1G, 1H, and 1I are sectional views illustrating steps of a process for producing a liquid ejection head according to an embodiment of the present invention.

Such a substrate as illustrated in FIG. 1A was first provided.

Specifically, a silicon substrate 103 having an ejection-energy-generating element 105 on the side of a front surface thereof was first provided. The thickness of the silicon substrate 103 was controlled to 200 μm.

A groove 113 in which an etch-stop layer will be formed subsequently is formed in a first surface (front surface) 110 of the silicon substrate 103. The groove 113 was formed by coating the first surface 110 of the silicon substrate 103 with a photoresist and then conducting dry etching after exposure and development. At this time, the width and depth of the groove 113 were controlled to 2 μm and 3 μm, respectively. The groove 113 was formed around a region where a liquid supply port is formed.

Thereafter, an oxidized film having a thickness of 700 nm was formed as an insulation layer 104 by plasma CVD. The insulation layer 104 functioned as an etch-stop layer and was also formed in the interior of the groove 113 (FIG. 1A). The insulation layer 104 was formed, on the substrate, on the ejection-energy-generating element 105, on the region where the liquid supply port is formed and in the interior of the groove 113.

Here, no particular limitation is imposed on the material of the insulation layer, which also serves as the etch-stop layer. However, examples thereof include SiO and SiN.

Figure 1B:
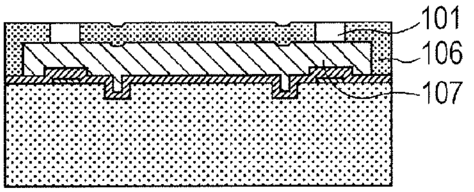

As illustrated in FIG. 1B, an adhesion layer (not illustrated) composed of a poly(ether amide) resin layer, a flow path pattern material 107 for a liquid flow path 108 and a nozzle plate 106 including an ejection orifice 101 were then formed on the substrate. The nozzle plate was formed with a photosensitive resin, and the flow path pattern material 107 was formed with a positive resist.

At this time, the thickness of the positive resist which is the material of the flow path pattern material 107 was 8 μm, the thickness of the photosensitive resin which is the material of the nozzle plate 106 was 10 μm, and these were formed on the substrate by spin coating.

Figure 1C:
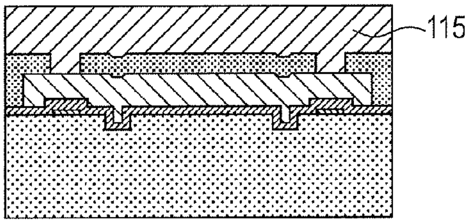

As illustrated in FIG. 1C, a protective film 115 for protecting the front surface was then formed with a resist. In this example, OBC (trade name) manufactured by TOKYO OHKA KOGYO CO., LTD. was used as a material of the protective film 115. However, other commercially available positive photoresists and other materials may also be used.

Figure 1D:
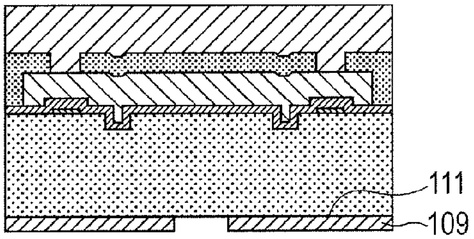

As illustrated in FIG. 1D, an etching mask 109 was then formed as a mask used upon the formation of a liquid supply port 102 by dry etching in a subsequent step on a second surface (surface opposite to the first surface) 111 of the silicon substrate 103. In this example, the etching mask 109 was formed by applying a photoresist OFPR (trade name) manufactured by TOKYO OHKA KOGYO CO., LTD. and then conducting exposure and development.

The liquid supply port 102 as a piercing aperture was then formed in the silicon substrate 103 by conducting dry etching from the side of the second surface (back surface side) to the first surface (front surface of the substrate). In this example, the dry etching was conducted by using an ICP etching apparatus (Model No. 601E manufactured by Alcatel Co.) according to the Bosch process.

Figure 1E:
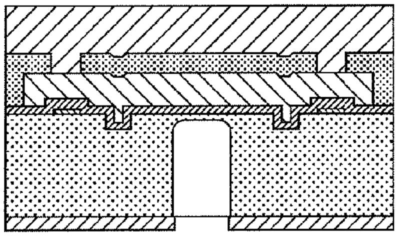

As illustrated in FIG. 1E, the liquid supply port is formed almost perpendicularly up to the middle of the dry etching and then reaches the insulation layer 104 that is the etch-stop layer.

Figure 1F:
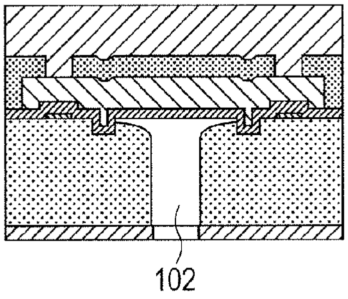

Taking dispersion upon production into consideration, the dry etching was continued (over etching was conducted) even after the etched surface reached the etch-stop layer. As a result, the front surface side opening portion of the liquid supply port 102 was spread laterally by the notching and reached the groove 113 as illustrated in FIG. 1F.

Figure 1G:
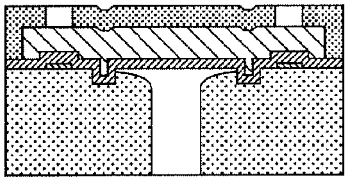

As illustrated in FIG. 1G, the etching mask 109 formed on the second surface 111 of the silicon substrate 103 and the protective film 115 were then removed.

Figure 1H:
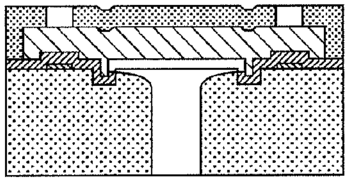

As illustrated in FIG. 1H, a portion of the insulation layer 104, which is the etch-stop layer, to communicate with which the opening portion of the liquid supply port was then removed by BHF.

Figure 1I:
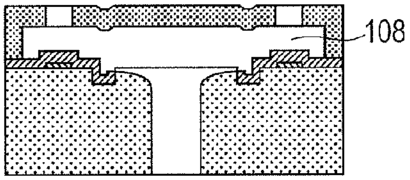

As illustrated in FIG. 1I, the flow path pattern material 107 was then removed, thereby forming a liquid flow path 108.

According to the process described in this example, there is no need of increasing a chip area for allowing the spreading by the notching upon the formation of the liquid supply port by the dry etching.

According to the process described in this example, the spreading of the notching until just under a heater is prevented by the etch-stop layer embedded in the groove, so that reliability can be improved.

EXAMPLE 2

The process for producing a substrate for a liquid ejection head according to this embodiment will now be described by an example with reference to FIGS. 2A to 2H.

Figure 2A:
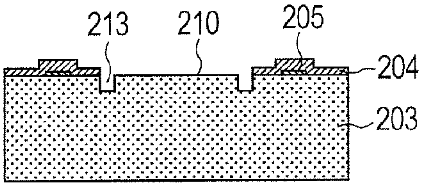
FIGS. 2A, 2B, 2C, 2D, 2E, 2F, 2G, and 2H are sectional views illustrating steps of a process for producing another liquid ejection head according to the embodiment.

Such a substrate as illustrated in FIG. 2A was first provided.

Specifically, an ejection-energy-generating element 205 and an insulation layer 204 formed on the ejection-energy-generating element 205 are arranged on a front surface of a silicon substrate 203. An oxide film having a thickness of 700 nm was formed as the insulation layer 204 by plasma CVD. The thickness of the silicon substrate 203 was controlled to 200 μm.

A groove 213 is formed around a region where a liquid supply port is formed in a subsequent step in a first surface 210 of the silicon substrate 203. The groove 213 was formed by coating the first surface 210 of the silicon substrate 203 with a photoresist and then conducting dry etching after exposure and development. At this time, the width and depth of the groove 213 were controlled to 2 μm and 3 μm, respectively.

Figure 2B:
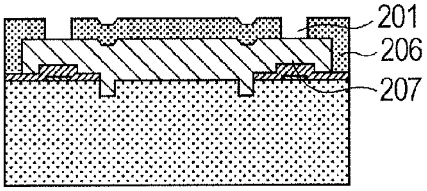

As illustrated in FIG. 2B, an adhesion layer (not illustrated) composed of a poly(ether amide) resin layer, a flow path pattern material 207 which is a pattern material for a liquid flow path 208 and a nozzle plate 206 including an ejection orifice 201 were then formed on the substrate. The nozzle plate was formed with a photosensitive resin, and the flow path pattern material 207 was formed from a soluble resin layer. A positive resist was used as a soluble resin.

Here, no particular limitation is imposed on the soluble resin. For example, a positive resist is favorable, and specific examples thereof include "ODUR" (trade name) manufactured by TOKYO OHKA KOGYO CO., LTD.

Since the flow path pattern material 207 also serves as an etch-stop layer in this example, the flow path pattern material 207 was formed so as to cover the front surface of the substrate in a region where a liquid supply port 202 is formed and to be embedded in the groove 213. The flow path pattern material 207 was formed, on the substrate, on a portion corresponding to a liquid flow path 208, on the region where the liquid supply port is formed and in the interior of the groove.

At this time, the thickness of the positive resist which is the material of the flow path pattern material 207 was 8 μm, the thickness of the photosensitive resin which is the material of the nozzle plate 206 was 10 μm, and these were formed on the substrate by spin coating.

Figure 2C:
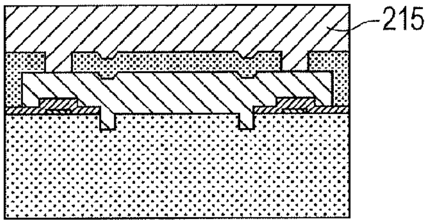

As illustrated in FIG. 2C, a protective film 215 for protecting the front surface was then formed with a resist. In this example, OBC (trade name) manufactured by TOKYO OHKA KOGYO CO., LTD. was used as a material of the protective film 215. However, other commercially available positive photoresists and other materials may also be used.

Figure 2D:
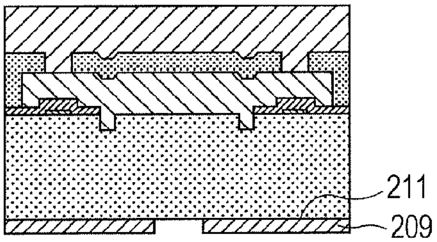

As illustrated in FIG. 2D, an etching mask 209 was then formed as a mask used upon the formation of a liquid supply port 202 by dry etching in a subsequent step on a second surface 211 of the silicon substrate 103. In this example, the etching mask 209 was formed by applying a photoresist OFPR (trade name) manufactured by TOKYO OHKA KOGYO CO., LTD. and then conducting exposure and development.

The liquid supply port 202 as a piercing aperture was then formed in the silicon substrate 203 by conducting dry etching from the side of the second surface (back surface side) to the first surface (front surface of the substrate). In this example, the dry etching was conducted by using an ICP etching apparatus (Model No. 601E manufactured by Alcatel Co.) according to the Bosch process.

Figure 2E:
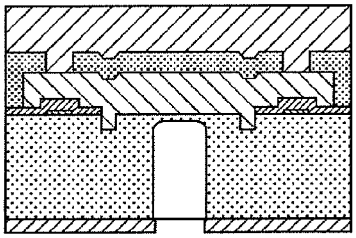

As illustrated in FIG. 2E, the liquid supply port is formed almost perpendicularly up to the middle of the dry etching and then reaches the positive resist 207 which is the etch-stop layer.

Figure 2F:
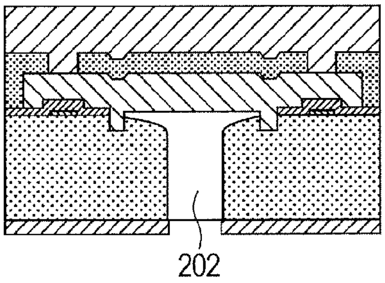

Taking dispersion upon production into consideration, the dry etching was continued (over etching was conducted) even after the etched surface reached the etch-stop layer. As a result, the front surface side opening portion of the liquid supply port 202 was spread laterally by the notching and reached the groove 213 as illustrated in FIG. 2F.

Figure 2G:
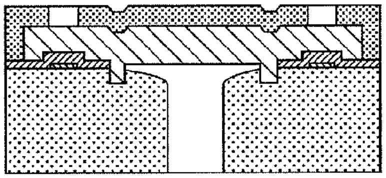

As illustrated in FIG. 2G, the etching mask 209 formed on the second surface 211 of the silicon substrate 203 and the protective film 215 were then removed.

Figure 2H:
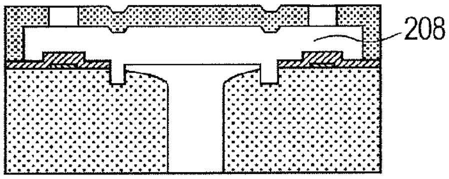

As illustrated in FIG. 2H, the flow path pattern material 207, which also serves as the etch-stop layer, was then removed by dissolution, thereby forming a liquid flow path 208.

In this example, the flow path pattern material such as the positive resist is used as the etch-stop layer, so that the step of removing the etch-stop layer after the liquid supply port is formed can also serve as the step of removing the flow path pattern material, and so the substrate for the liquid ejection head can be produced through fewer steps.

The mode of the liquid ejection head has been mainly described above. As application examples of the present invention, an ink jet recording head may be mentioned. However, the application range of the present invention is not limited thereto. For example, the present invention can be applied to production of a biochip and printing of an electronic circuit in addition to recording with an ink. Examples of the liquid ejection head include a head for production of a color filter in addition to the ink jet recording head.

In addition to the processes for producing the substrate for the liquid ejection head and the liquid ejection head, the present invention may also be understood to be a process for producing a substrate with a piercing aperture having a piercing aperture.

According to the present invention, there can be provided a process for producing a substrate with a piercing aperture, the substrate having a piercing aperture of a form almost perpendicular to the substrate, by which the spread of an opening portion by notching can be inhibited. Favorably, the present invention can provide a process for producing a substrate for a liquid ejection head or a liquid ejection head which has a liquid supply port of an almost perpendicular form, by which the spread of an opening portion by notching can be inhibited. The increase in chip size and lowering of reliability caused by the notching can be thereby inhibited.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-171252, filed on Aug. 1, 2012, which is hereby incorporated by reference herein in its entirety.

What is claimed is:

1. A process for producing a substrate with a piercing aperture, the piercing aperture being formed by conducting dry etching from the side of a second surface to a first surface of a substrate, the second surface being opposite to the first surface, the process comprising, in the following order, the steps of:

(a) forming a groove around a region where the piercing aperture is to be formed in the first surface of the substrate;

(b) forming a first etch-stop layer in the region where the piercing aperture is to be formed in the first surface of the substrate and a second etch-stop layer in the interior of the groove; and (c) conducting the dry etching from the side of the second surface until reaching the first etch-stop layer to form the piercing aperture, wherein the second etch-stop layer is formed at a position closer to the second surface than a part of the first etch-stop layer, to which the dry etching reaches, is to the second surface.

2. The process according to claim 1, wherein in the step (c), over etching is conducted after the dry etching reaches the first etch-stop layer, thereby spreading an opening portion of the piercing aperture on the side of the first surface up to the groove.

3. The process according to claim 1, further comprising a step of removing at least a portion of the first etch-stop layer, the portion corresponding to the first surface side opening portion of the piercing aperture, after the step (c).

4. The process according to claim 1, wherein a Bosch process is applied for the dry etching.

5. A process for producing a substrate for a liquid ejection head, comprising forming a liquid supply port by using the process according to claim 1.

6. A process for producing a liquid ejection head comprising a substrate having an ejection-energy-generating element which generates energy for ejecting a liquid on a first surface thereof, and a flow path forming member in which a liquid ejection orifice which ejects the liquid and a liquid flow path communicating with the liquid ejection orifice are formed on a side of the first surface of the substrate, the substrate having a liquid supply port which supplies the liquid to the liquid flow path, the process comprising, in the following order, the steps of:

(a) forming a groove around a region where the piercing aperture is to be formed in the first surface of the substrate;

(b) forming a first etch-stop layer in the region where the piercing aperture is to be formed in the first surface of the substrate and a second etch-stop layer in the interior of the groove; and (c) conducting the dry etching from a side of a second surface opposing the first surface until reaching the first etch-stop layer to form the liquid supply port, wherein the second etch-stop layer is formed at a position closer to the second surface than a part of the first etch-stop layer, to which the dry etching reaches, is to the second surface.

7. The process according to claim 6, wherein in the step (c), over etching is conducted after the dry etching reaches the first etch-stop layer, thereby spreading an opening portion of the liquid supply port on the side of the first surface up to the groove.

8. The process according to claim 6, wherein the first etch-stop layer also serves as a flow path pattern material for the liquid flow path.

9. The process according to claim 8, wherein in the step (b), the flow path pattern material is formed with a soluble resin in a portion corresponding to the liquid flow path, in the region where the liquid supply port is to be formed, and in the interior of the groove, thereby forming the first and second etch-stop layers.

10. The process according to claim 9, further comprising a step of removing the flow path pattern material by dissolution after the step (c).

11. The process according to claim 6, wherein the first etch-stop layer also serves as an insulation layer for protecting the ejection-energy-generating element.

12. The process according to claim 11, wherein in the step (b), the insulation layer is formed, on the substrate, on the ejection-energy-generating element, on the region where the liquid supply port is to be formed and in the interior of the groove, thereby forming the first and second etch-stop layers.

13. The process according to claim 12, further comprising a step of removing at least a portion of the etch-stop layer, the portion communicating with the first surface side opening portion of the liquid supply port, after the step (c).

14. The process according to claim 6, wherein the Bosch process is applied for the dry etching.

15. The process according to claim 6, wherein the depth of the groove is 1 μm or more and 30 μm or less.

16. The process according to claim 1, wherein the first etch-stop layer and the second etch-stop layer comprise a continuously formed layer.

17. The process according to claim 6, wherein the first etch-stop layer and the second etch-stop layer comprise a continuously formed layer.

* * * * *